Patented Mar. 7, 1939

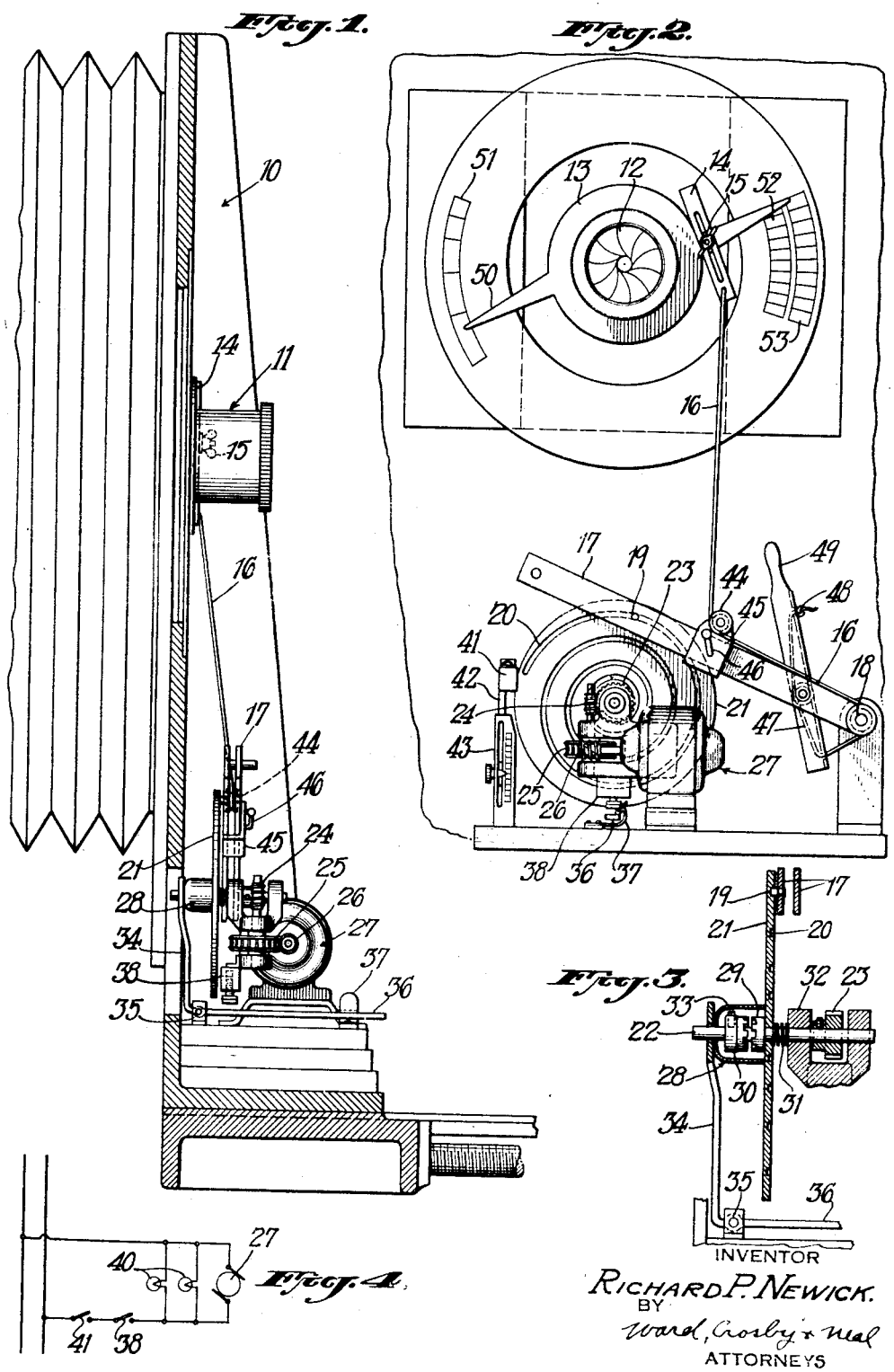

2,149,743

UNITED STATES PATENT OFFICE 2,149,743

CAMERA EXPOSURE CONTROL APPARATUS

Richard P. Newick, Rutherford, N. J.

Application December 31, 1937, Serial No. 182,774

10 Claims. (Cl. 95—64)

This invention relates to apparatus for automatically varying or controlling the diaphragm or shutter opening of cameras, and also for controlling the electric lighting means used for illumination of the object or subject matter being photographed.

The invention is particularly adaptable to cameras of the type used in making screen photographs in the halftone engraving process for reproducing photographs. With such cameras it is customary to subject the negative to a series of exposures with the camera diaphragm adjusted differently during each exposure, in order to maintain in the reproduction the proper relative values of both the lighter and shaded portions of the picture. To this end, the camera diaphragm has usually been controlled manually, and its proper successive adjustments require a high degree of care by an experienced operator, and the proper timing of each of the successive exposures requires painstaking attention. At the same time the operator must devote considerable attention to the control of the lighting of the picture or object being photographed. These considerations in the making of halftone reproductions usually require that the camera operator must not only have considerable experience, but must usually devote his undivided attention to the operation of a single camera. On the other hand, with the present invention, means are provided for more accurately and efficiently accomplishing these purposes by automatically varying the opening of the camera diaphragm or shutter with a properly predetermined but varying motion, and between predetermined limits, while at the same time, if desired, automatically turning on and off, at proper times, the electric lighting means used.

It is a further object of the present invention to provide apparatus for automatically varying the opening of a camera diaphragm or the like, in which the various parts are simple in construction and so arranged that they may be quickly and easily operated and adjusted by a relatively inexperienced person, to accommodate a wide variety of circumstances such as met with in halftone work.

Various further and more specific objects, features and advantages of the invention will clearly appear from the detailed description given below taken in connection with the accompanying drawing which forms a part of this specification and illustrates by way of example a preferred form of the invention. The invention consists in such novel features, arrangements and combinations of parts as may be shown and described in connection with the example of the invention herein disclosed.

In the drawing, Fig. 1 is a side elevational view of a portion of a camera equipped with the apparatus of the invention;

Fig. 2 is a face view of the apparatus as applied to the camera in use;

Fig. 3 is a vertical sectional view of a portion of the apparatus of Fig. 1; and Fig. 4 is a schematic diagram showing one example of an electrical circuit which may be used in controlling the diaphragm operating apparatus as well as the lighting means.

In the drawing a camera of any well-known suitable construction, such for example as may be particularly adapted for halftone work, is shown at 10 having an objective lens holder 11, and including an iris diaphragm 12 which may be of a suitable well-known construction, wherein the size of the aperture may be varied by turning a ring member as at 13 surrounding the objective. In the form of the apparatus shown, this ring 13 may be arranged to carry a slotted strip 14 rotatably and slidably fixed upon the ring as b, a thumb screw 15. A wire or cord of suitable fibrous material as at 16 may be secured at its upper end to the lower end of the strip 14 and secured at its lower end, in a manner hereinafter described, to a lever 17.

The lever 17 may be pivoted as at 18 on a suitable support and is provided as at 19 with a pin or other suitable projection for engaging a spiral groove or equivalent cam surface 20 formed on the face of a rotatable disc 21. The disc 21 may be mounted upon a shaft 22 (Fig. 3). The shaft 22 in turn may be driven through suitable reduction gearing as at 23, 24, 25 and 26, by an electric motor 27. The disc 21 may normally be free to turn in respect of shaft 22, but when the disc is being driven by the motor 27, it may be connected to the shaft 22 as by clutch means 28.

This clutch means may for example comprise a clutch portion 29 affixed to the disc 21, for cooperation with another clutch portion 30 affixed to the shaft 22. The disc 21 and the clutch portion 29 secured thereto, may be slidable on the shaft 22 and are biased toward the left as shown in Fig. 3, as by a spiral spring 31 interposed between the disc 21 and a shaft bearing 32. Thus, the action of the spring 31 is such as to tend to hold the clutch in engaged condition. However, the clutch may be normally retained out of engaged condition by a cup-shaped annular member 33, the periphery of which normally bears against the disc 21 in opposition to the spring 31. This cup-shaped member 33 may be held in such position as by a lever member 34 pivotally mounted as at 35 and having a handle portion 36 for manipulating the same. The handle portion 36 may be normally held down by a hook-like member 37 near the base of the motor, and thereby retaining the clutch in its disengaged condition. However, the handle portion 36 may be somewhat resilient so that it may be disengaged from the hook 37 and then elevated somewhat, causing the lever member 34 to move to the left as viewed at Fig. 1. This in turn releases the pressure of the cup-shaped member 33 against the disc 21 permitting the spring 31 to throw the clutch parts into engagement.

A suitable well-known form of enclosed switch may be provided as at 38 suitably supported just above the handle member 36 so that when this member is raised for throwing the clutch into engagement, the switch 38 will also be closed thereby closing an electrical circuit for starting the motor 27. One example of such a circuit is shown in Fig. 4, which circuit may also include suitable lamps as at 40, which will be energized concurrently with the starting of the motor for illuminating the photograph or other subject matter to be reproduced. The operation of the motor as will be hereinafter more fully described, will rotate the disc 21 and thereby cause the lever 17 to drop and finally engage the parts of a suitable stop switch as at 41, such switch being then automatically opened and thereby disconnecting the source of power from the motor 27 and lamps 40, as will be apparent from Fig. 4. The switch 41 may be of a suitable well-known enclosed type, like or similar to switch 38 and may be mounted upon a supporting rod 42, the elevation of which may be adjusted by any suitable means such as indicated at 43 (Fig. 2).

The lower end of the cord 16 may pass over a pulley 44, or the like, carried on a member 45 slidable along the lever 17. This slidable member may be manually adjusted along the lever 17 and when at the desired position, may be fixed to the lever as by turning a suitable clamping screw as at 46. From the pulley 44 the cord 16 may pass around the pivot of the lever 17, and then be suitably affixed to a manually adjustable lever 47, which in turn is pivoted upon the lever 17 as shown. It will be noted that the arrangement of the levers 17, 47 and the cord 16 is such that manual adjustments of the lever 47 will vary the length of the cord between the lever 17 and the diaphragm mechanism. That is, for example, movement of the lever 47 to the right as viewed in Fig. 2, will tend to tighten the cord, with the result that if the lever 17 is fixed in position, a pull will be imparted on the diaphragm operating ring 13 in a direction tending for example, to close or partly close the diaphragm. On the other hand, if the lever 47 is moved to the left, as viewed in Fig. 2, the cord will be loosened, permitting the operator to open the diaphragm more widely. As indicated in Fig. 2, the cord 16 may preferably terminate with its end knotted as at 48, and secured at a point near the upper end of handle 49 of the lever 47, so that the end of the cord may be easily untied for readjustment of its length.

The apparatus may be operated as follows. The photograph or other subject matter to be reproduced, is mounted within the view of the camera in the usual way and with the lamps 40 in proper position for providing adequate and uniform illumination thereon. The operator then determines from the results of previous trials or experience, the approximate size of aperture which should be provided in the diaphragm at the beginning and at the ending of the exposure period, and also the duration of the exposure period, and the proper progressively changing rate at which the opening of the diaphragm should be varied in moving from its initial to its final positions. The diaphragm operating ring 13 may for example be provided with a pointer as at 50 cooperating with a suitable scale 51 so marked as to indicate the aperture size as the ring 13 is turned. The pointer 50 may first be turned to adjust the diaphragm to the degree of opening desired at the start of the exposure. The diaphragm operating ring 13 may also be provided with another pointer operating over a scale 52 having markings representative of the degree of reproduction or enlargement to be secured in the reproduction. With the manual process for controlling a series of exposures as heretofore generally used in halftone work, it has required considerable care, time and experience in computing or estimating the several exposure times and diaphragm openings. However, with the present invention this may be eliminated. The operator merely adjusts the pointer to the desired reproduction size indicated on the scale 52 so that the diaphragm movement will start from such position at the beginning of the exposure period. At this time the above described clutch for operating the disc 21 will be disengaged so that the disc 21 and the lever 17 connected thereto by the pin 19 may be moved to their upper or starting position, and the cord 16 is adjusted taut by lever 49, ready to move the diaphragm in the desired direction when the disc is so rotated as to permit the lever 17 to fall. The lever 17 may be made sufficiently yieldable so that the pin 19 thereon may be then removed from the spiral groove 20 by flexing the lever 17, whereby the lever may be pulled down until the diaphragm is moved to the position desired at the termination of the exposure period. At this time the elevation of the switch 41 may be adjusted by the means 43 to a point such that the switch will be opened by the lever as it reaches its desired lower position corresponding to the termination of the exposure period. When the switch 41 is thus properly adjusted, the lever 17 may be restored to its upper or starting position, the diaphragm at the same time being manually restored to its starting position. Meanwhile if desired, various adjustments may be made as by sliding or turning the strip 14, by changing the length of the cords 16, or by sliding the member 45, to determine the progressively changing rate at which the diaphragm will be moved.

For example, if the strip 14 is slid upwardly and secured in that position by thumb screw 15, the initial movement of the diaphragm upon starting the motor will be relatively rapid, but will gradually become slower as the diaphragm ring is turned. Again, if the lower end of the strip 14 is moved outwardly to the right from the diaphragm, its radius of movement will be such that the initial movement of the diaphragm will be very rapid, but will rapidly diminish as the strip approaches a position beneath the diaphragm. Also, if for example, the slidable member 45 is moved toward the pivotal point 18 of lever 17, the effective radius of the lever 17 acting on the cord 16 will be diminished, so that the rate of movement of the diaphragm throughout its period of movement, as well as the extent of its movement, will be diminished. On the other hand, this rate and extent of movement may be correspondingly increased by moving the slidable member 45 toward the outer end of lever 17. In general when the upper end of the cord 16 as shown in Fig. 2 is attached to a high point, the movement of the diaphragm will be such as to give what is known as a "highlight" negative. And when the upper end of the cord is attached at a relatively low point, the negative will be of what is known as an "open" character. And again when the upper end of the cord is attached at a point of intermediate height, a negative of normal character will be produced. Of course, instead of using the slidable strip 14, the cord may alternatively be directly secured along the righthand peripheral edge of the ring 13.

By adjusting the lever 47 which will adjust the effective length of the cord 16, the operator may readily adjust the cord so as to be taut, as well as adjusting the position of the diaphragm to have its motion start at a desired position as above described. Also, if preferred, the operator may turn the disc 20 while the clutch is disengaged so as to have the lever 17 start its movement from a desired initial position. And as above explained, the position of the diaphragm at the termination of the movement may be determined by adjusting the elevation of the stop switch 41. Thus a wide variety of adjustments may be readily secured so that both the starting and stopping movements of the diaphragm may occur with the aperture of desired sizes, and so that the changing rate of movement from the starting to the stopping positions may be varied widely, and either to give a relatively fast or comparatively slow initial movement, such as gives the best results as determined by trial and experience.

After the above described adjustments have been made, the operator may release the handle 36 from the hook 37, thereby causing the clutch to engage and the motor to start. At the same time the lights 40 will be turned on, thus starting the exposure period. The disc 21 will then rotate and the cam surface 20 will carry or pull the lever 17 downwardly until it opens the stop switch 41 for disconnecting the lights and motor. Meanwhile, the cord 16 will have caused the diaphragm aperture to change with a predetermined varying rate from the starting condition to the desired final condition of the aperture. Thus the negative is given a single exposure through a varying aperture for accurately accomplishing the purposes customarily achieved with a series or manually timed and adjusted exposures.

At any time after the stop switch 41 is operated as above described, the attendant at his convenience may move the handle 36 downwardly and secure it beneath the hook 37, thus throwing the clutch out of engagement, and disconnecting the motor and light circuit at switch 38. Then the lever 17 may be disengaged from the disc 21 and raised to its starting position for the next operation, the switch 41 thereupon moving again to its closed position. The diaphragm also may now be restored to its desired initial starting position for the next operation.

For the usual run of reproduction work, once the proper adjustments have been made, the only readjustment necessary will be that of placing the pointer at the proper point on the scale 52 corresponding to the desired degree of enlargement or reduction, after which the operator makes certain that the lever 17 is at its proper upper starting position and makes certain that the cord 16 is pulled taut by the lever 17, whereupon the apparatus may be started by pulling up the lever 36.

Following the exposure of the halftone negative as above described, it is customary to expose the negative to a short flash of strong light with the camera aperture nearly closed. This is for the purpose of causing the dark or black areas of the reproduction to be reproduced with a slight grayness. The length of time required for this "flash" exposure is variable, depending upon the size of the reproduced picture. In order that an unskilled operator may readily determine the proper period for this "flash" exposure for each size of reproduction, the camera may be provided on its face with a scale of flash periods as at 53 with markings properly corresponding to the scale of reproduction sizes at 52.

The above described arrangement for turning on the electric lights concurrently with the starting of the exposure and for automatically turning off the lights concurrently with the completion of the predetermined exposure period, have been found to have a number of important advantages. For example, the arrangement not only permits saving of current for the powerful lamps by restricting the use of the illumination to the desired period of exposure, but it also permits the operator to manipulate the apparatus without being subjected to the glare and heat of the lights. Also the automatic throwing on of the light concurrently with the starting of the mechanically controlled exposure period, insures that the lamps will not be turned on prematurely or during the making of adjustments, and insures that the exposure period will not partially lapse before the lamps are turned on. The automatic turning off of the lamps permits the aperture diaphragm movement to be so adjusted as to stop at any desired predetermined position while insuring that the lamps will be immediately and concurrently turned off to terminate the exposure at the proper moment even though the operator may be attending to other machines. The use of separate switches for closing and for opening the control circuit particularly in conjunction with the clutch arrangement above described, serve to insure against unintended turning on of the lamps at a time when such action might destroy the negative. That is, before the disc 21 may be manually freely turned to restore it to its starting position, the clutch must be disengaged, which will simultaneously disconnect the control circuit at the switch 38, whereupon the raising of the lever 17 and the consequent closing of switch 41 will be ineffective to turn on the lights. The use of the separate switches also permits adjustment of the timing of the operation of the stop switch quite independently of the operation of the starting switch and clutch.

The use of the spiral cam surface on the face of the rotating disc 21 is of special advantage in that it permits the engaging pin 19 to be quickly applied to any desired part of the cam surface, in starting the operation, after manually turning the disc to the desired position. And all parts of the cam surface may be quickly viewed by the operator in determining just what portions of the cam surface are to be used. The cam surface when made in the form of a spiral groove as shown, provides an unusually durable and inexpensive construction to manufacture.

In many cameras such as used for halftone work, the lens diaphragm assembly is mounted upon a plate which is adjustable in position over the face of the camera, whereby the assembly may be properly centered in respect to the subject matter being photographed or in respect to the film holder. With such cameras the above described arrangement using the cord as at 16 has the advantage of readily accommodating such adjustments, whereas with a rigid connecting means between the diaphragm assembly and the operating mechanism of this invention, it would be difficult or impossible to accommodate the different adjustments of the position of the diaphragm assembly without resorting to complicated or expensive mechanical parts.

With the above described invention it is possible to effect a very decided decrease in the total time required for the exposure of each negative as compared with the usual time required for manually controlling a series of separate different exposures. Also the varying degrees of the strength of light to which the negative is exposed may be readily kept in proper proportion throughout the exposure period even though the speed of movement of the diaphragm may be altered as for example by varying the effective length of lever 17 or by varying the motor speed.

While the invention has been described with respect to a certain particular preferred example which gives satisfactory results, it will be understood by those skilled in the art, after understanding the invention, that various changes and modifications may be made without departing from the spirit and scope of the invention, and it is intended, therefore, in the appended claims to cover all such changes and modifications.

What is claimed as new and desired to be secured by Letters Patent of the United States is:

1. Apparatus for automatically varying the opening of a camera diaphragm and for controlling electric lighting means for the illumination of the subject matter being photographed, comprising a cam of varying contour, movable means engaging said cam and connected to operate the diaphragm, an electric motor, a clutch for interconnecting said motor and cam, a manually movable member for causing said clutch to become engaged or disengaged, switch means in the circuit of said lighting means and the circuit of said motor and operatively connected to said manually movable member to turn on said lighting means and start the motor upon engagement of said clutch, and means controlled by the diaphragm moving means for automatically disconnecting said lighting means and motor from their source of power when the diaphragm has been moved a predetermined extent.

2. Apparatus for automatically varying the opening of a camera diaphragm and for controlling electric lighting means for illumination of the subject matter being photographed, comprising a cam of varying contour, movable means engaging said cam and connected to operate the diaphragm, an electric motor, a switch in the circuit of said lighting means and of said motor to simultaneously start said motor and turn on said lighting means, another switch means controlled by the diaphragm moving means for automatically disconnecting said lighting means and motor from their source of power when the diaphragm has been moved a predetermined extent.

3. Apparatus for automatically varying the opening of a camera diaphragm and for controlling electric lighting means for the illumination of the subject matter being photographed, comprising a cam of varying contour, movable means engaging said cam and connected to operate the diaphragm, an electric motor, a clutch for interconnecting said motor and cam, a manually movable member for causing said clutch to become engaged or disengaged, and switch means in the circuit of said lighting means and the circuit of said motor and operatively connected to said manually movable member to turn on said lighting means and start the motor upon engagement of said clutch.

4. Apparatus for automatically varying the opening of a camera diaphragm comprising a lever connected to operate the diaphragm, a cam of varying contour and operatively connected to said lever to variably move the latter, an electric motor connected to drive said cam, a switch in the circuit of said motor, and means whereby said lever causes actuation of said switch to stop said motor upon movement of said lever to a predetermined position.

5. Apparatus for automatically varying the opening of a camera diaphragm, comprising a motor driven rotatable disc having on its face a spiral groove surrounding the disc axis, a lever having means thereon for removably engaging said groove whereby during such engagement the lever is given a varying motion as the disc rotates, and means interconnecting said lever and the diaphragm whereby the diaphragm is closed with a varying motion upon such movement of said lever, the lever being disengageable to permit independent manual adjustments of the lever and of the angular position of the disc.

6. Apparatus for automatically varying the opening of a camera diaphragm, comprising a lever, means for imparting a varying motion to said lever, a cord interconnecting the diaphragm mechanism and said lever, manually slidable means on said lever for altering the effective point on said lever at which the cord is secured, and manually adjustable means on said lever for altering the effective length of the cord between said lever and the diaphragm mechanism.

7. Apparatus for automatically varying the opening of a camera diaphragm, comprising a lever, means for imparting a varying motion to said lever, a cord interconnecting the diaphragm mechanism and said lever, manually slidable means on said lever for altering the effective point on said lever from which the cord extends to the diaphragm mechanism, and a manually operable lever near the pivot point of said first named lever, said cord running over said slidable means to said last named lever, whereby adjustments of the latter serve to adjust the effective length of the cord to the diaphragm mechanism.

8. Apparatus for automatically varying the opening of a camera diaphragm, comprising a cam of varying contour, movable means engaging said cam and connected to operate the diaphragm, an electric motor, a clutch for interconnecting said motor and cam, a manually movable member for causing said clutch to become engaged or disengaged, and switch means in the circuit of said motor and operatively connected to said manually movable member to start the motor upon engagement of said clutch.

9. Apparatus for automatically varying the opening of a camera diaphragm, comprising a rotatable disc having on its face a spiral groove surrounding the disc axis, a lever having means thereon for removably engaging said groove whereby during such engagement the lever is given a varying motion as the disc rotates, means interconnecting said lever and the diaphragm whereby the diaphragm is operated with a varying motion upon movement of said lever, an electric motor, a clutch for interconnecting said motor and disc, a manually movable member for causing said clutch to become engaged or disengaged, and switch means in the circuit of said motor and operatively connected to said manually movable member to start the motor upon engagement of said clutch.

10. Apparatus for automatically varying the opening of a camera diaphragm, comprising a motor driven rotatable disc having on its face a spiral cam surface surrounding the disc axis, a lever having means thereon for removably engaging said cam surface, whereby during such engagement the lever is given a varying motion as the disc rotates, manually disengageable clutch means for operatively connecting said disc to the motor, and means interconnecting said lever and the diaphragm whereby the diaphragm is operated with a varying motion upon movement of said lever, the lever being disengageable to permit manual adjustment of the angular position of the disc independently of the lever and the motor when the clutch is disengaged.

RICHARD P. NEWICK.